(12) United States Patent
Ukil et al.

(10) Patent No.: US 11,445,414 B2
(45) Date of Patent: Sep. 13, 2022

(54) NEIGHBOR MEASUREMENT METHOD FOR MULTIPLE SUBSCRIBER IDENTITY MODULE (SIM) USER EQUIPMENT (UE)

(71) Applicant: QUALCOMM Incorporated, San Diego, CA (US)

(72) Inventors: Aritra Ukil, Hyderabad (IN); Amit Mandil, Hyderabad (IN); Raghu Babu Movva, Hyderabad (IN); Aparajith Chamarthi, Hyderabad (IN); Muralidharan Murugan, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/177,147

(22) Filed: Feb. 16, 2021

(65) Prior Publication Data

US 2022/0264382 A1   Aug. 18, 2022

(51) Int. Cl.
*H04W 36/00* (2009.01)
*H04W 76/28* (2018.01)
*G06F 16/215* (2019.01)
*H04W 8/18* (2009.01)

(52) U.S. Cl.
CPC ...... *H04W 36/0058* (2018.08); *G06F 16/215* (2019.01); *H04W 8/18* (2013.01); *H04W 36/0061* (2013.01); *H04W 76/28* (2018.02)

(58) Field of Classification Search
CPC . H04W 88/06; H04W 36/0088; H04W 8/183; H04W 36/30; H04W 60/005; H04W 76/28; H04W 36/00; H04W 36/00837; H04W 36/00835
See application file for complete search history.

(56) References Cited

U.S. PATENT DOCUMENTS

| | | | | |
|---|---|---|---|---|
| 9,319,977 | B2* | 4/2016 | Nayak | H04W 48/18 |
| 9,338,713 | B2 | 5/2016 | Chakravarthy et al. | |
| 9,491,276 | B2 | 11/2016 | Kanamarlapudi et al. | |
| 9,820,091 | B1* | 11/2017 | Kumar | H04W 4/02 |
| 2014/0295831 | A1* | 10/2014 | Karra | H04W 68/005 |
| | | | | 455/434 |
| 2014/0342728 | A1* | 11/2014 | Dhanda | H04W 24/00 |
| | | | | 455/422.1 |
| 2016/0302114 | A1* | 10/2016 | Jain | H04B 1/3816 |
| 2016/0373948 | A1* | 12/2016 | Sanka | H04W 36/0085 |
| 2017/0048773 | A1* | 2/2017 | Miao | H04B 1/3816 |

(Continued)

FOREIGN PATENT DOCUMENTS

| | | |
|---|---|---|
| WO | 2015051157 A1 | 4/2015 |
| WO | 2015148711 A1 | 10/2015 |
| WO | 2016164149 A1 | 10/2016 |

*Primary Examiner* — Dung Hong

(74) *Attorney, Agent, or Firm* — Seyfarth Shaw LLP

(57) ABSTRACT

A method of wireless communication by a user equipment (UE) capable of supporting multiple subscriptions, includes measuring, with a first of the multiple subscriptions, neighbor cells of at least one other subscription of multiple subscriptions. The method also includes storing measurement results from measuring the neighbor cells in a common measurement results database, while avoiding duplicates. The method further includes reporting, with a subscription for which a neighbor is configured by a network, the measurement results from the common measurement results database.

30 Claims, 11 Drawing Sheets

(56) References Cited

U.S. PATENT DOCUMENTS

2017/0325144 A1\* 11/2017 Raghunathan ........ H04W 36/16
2018/0109978 A1     4/2018 Zhao et al.
2019/0014542 A1\*  1/2019 Jain .................... H04W 52/028
2019/0159116 A1\*  5/2019 Guan ................... H04W 60/00

\* cited by examiner

NEIGHBOR MEASUREMENT METHOD FOR MULTIPLE SUBSCRIBER IDENTITY MODULE (SIM) USER EQUIPMENT (UE)

FIELD OF THE DISCLOSURE

Aspects of the present disclosure generally relate to wireless communications, and more particularly to techniques and apparatuses for an improved neighbor measurement method for multiple subscriber identity module (SIM) user equipments (UEs), such as dual SIM dual active (DSDA) and dual SIM dual standby (DSDS) UEs.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In one aspect of the present disclosure, a method of wireless communication by a user equipment (UE) capable of supporting multiple subscriptions includes measuring, with a first of the multiple subscriptions, neighbor cells of at least one other subscription of the multiple subscriptions. The method further includes storing measurement results from measuring the neighbor cells in a common measurement results database, while avoiding duplicates. The method still further includes reporting, with a subscription for which a neighbor is configured by a network, the measurement results from the common measurement results database.

Another aspect of the present disclosure is directed to an apparatus of a user equipment (UE) for wireless communication, which is capable of supporting multiple subscriptions. The UE has a memory and one or more processors coupled to the memory. The processor(s) is configured to measure, with a first of the multiple subscriptions, neighbor cells of at least one other subscription of the multiple subscriptions. The processor(s) is further configured to store measurement results from measuring the neighbor cells in a common measurement results database, while avoiding duplicates. The processor(s) is still further configured to report, with a subscription for which a neighbor is configured by a network, the measurement results from the common measurement results database.

Another aspect of the present disclosure is directed to an apparatus for wireless communication capable of supporting multiple subscriptions including means for measuring, with a first of the multiple subscriptions, neighbor cells of at least one other subscription of the multiple subscriptions. The apparatus further includes means for storing measurement results from measuring the neighbor cells in a common measurement results database, while avoiding duplicates. The apparatus still further includes means for reporting, with a subscription for which a neighbor is configured by a network, the measurement results from the common measurement results database.

In another aspect of the present disclosure, a non-transitory computer-readable medium with program code recorded thereon is disclosed. The program code is executed by a processor and includes program code to measure, with a first of multiple subscriptions, neighbor cells of at least one other subscription of the multiple subscriptions. The program code further includes program code to store measurement results from measuring the neighbor cells in a common measurement results database, while avoiding duplicates. The program code still further includes program code to report, with a subscription for which a neighbor is configured by a network, the measurement results from the common measurement results database.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
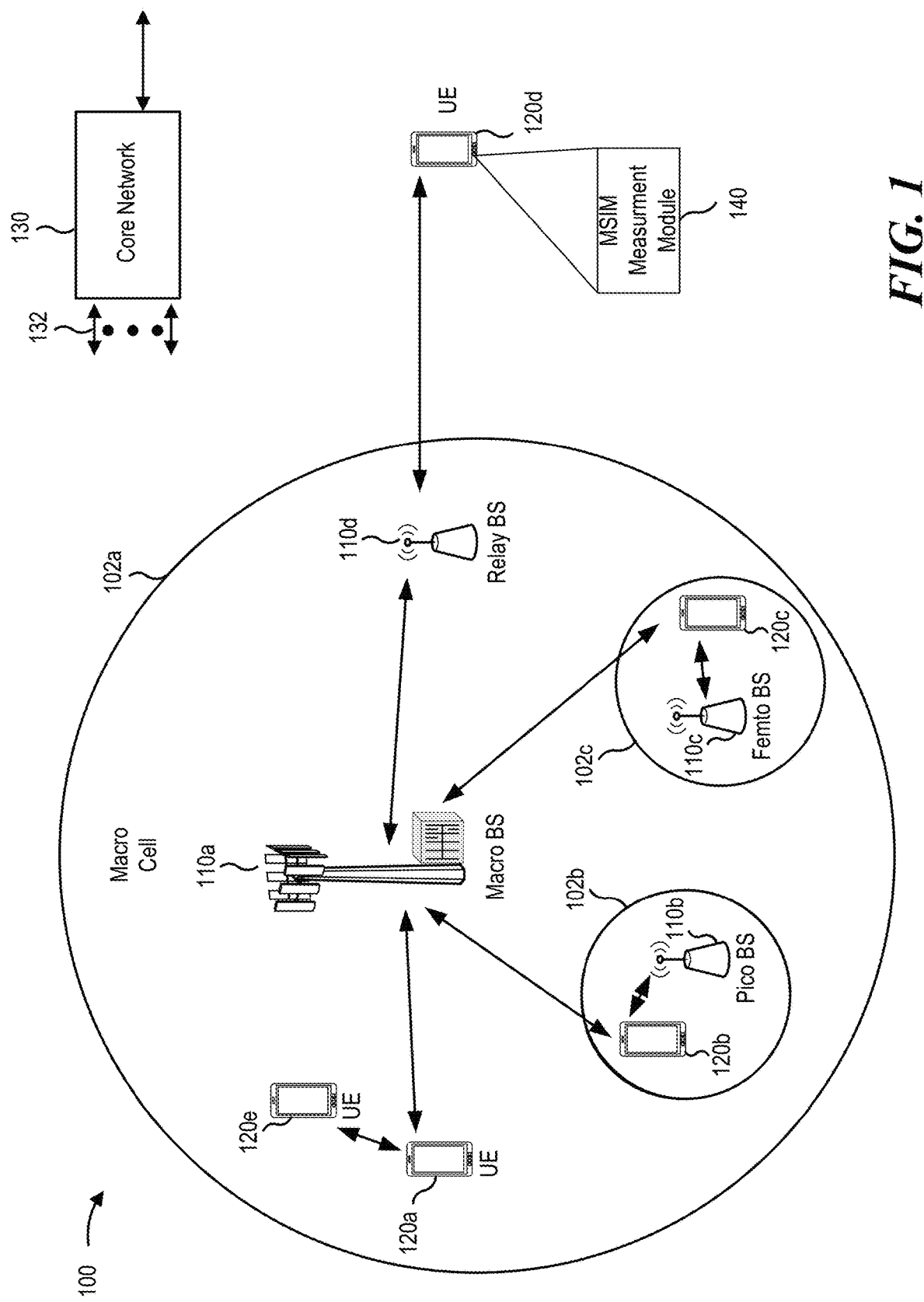
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

A multi-SIM (subscriber identity module) UE is a UE with multiple mobile network subscriptions. For example, a UE may have a first subscription with Verizon Wireless and a second subscription with AT&T Wireless. Thus, the UE can connect to either or both of the mobile networks. An example use case of a multi-SIM device is a mobile phone with a first subscription dedicated to personal calls and a second subscription dedicated to business calls. Although the following description primarily refers to dual SIM devices, the present disclosure contemplates multi-SIM UEs with more than two SIMs.

According to aspects of the present disclosure, a power and throughput performance optimized neighbor measurement method is proposed for a multi-SIM UE, such as a Dual SIM, Dual Active (DSDA) and a Dual SIM, Dual Standby (DSDS) UE. A DSDA UE has two transceivers to allow connection to both subscriptions simultaneously. A DSDS UE has a single transceiver shared between the two SIMs to allow connection to one subscription at a time. For DSDS UEs, the processor manages both SIMs simultaneously although communication does not occur via both SIMs simultaneously. Throughout this description, the terms 'SIM' and 'subscription' will be used interchangeably.

Handover is a radio resource control (RRC) connected mode mobility procedure for keeping the UE connected at all times. Cell reselection is an RRC idle mode mobility procedure to ensure the UE is camped on a cell at all times. As a pre-requisite for these procedures, the UE periodically performs measurements of neighbor cell strengths. The UE sends measurement reports for neighbors in radio resource control (RRC) connected mode and performs self-evaluation to move to a stronger neighbor cell in RRC idle mode. When the term 'measurement' or 'measure' is used, the actions of searching or measuring, or both are contemplated.

With existing systems, DSDS and DSDA UEs perform individual neighbor cell search and measurements for each subscription inefficiently in terms of the overall current and power consumption at the battery. The UEs may also be inefficient with respect to performance and throughput for the connected subscription. For example, with DSDS and DSDA UEs, additional sleep/wakeup overhead causes extra power drain by individual subscriptions in order to perform their own neighbor cell search and measurements.

In some aspects of the present disclosure, a connected subscription may utilize network configured gaps to measure frequencies on behalf of other subscriptions. The UE may use the connected subscription for multiple frequency measurements in each gap, using extra radio frequency (RF) chains (for example, provided for carrier aggregation (CA)), to finish measurements faster.

In some aspects of the present disclosure, a connected subscription may utilize a network synchronized connected mode discontinuous reception (C-DRX) OFF time to measure frequencies on behalf of additional subscriptions. The UE may use the connected subscription for multiple frequency measurements in parallel to finish the measurements.

When both subscriptions are idle, one of the subscriptions may utilize DRX cycle gaps to measure frequencies on behalf of other subscriptions. The UE may perform multiple frequency measurements in parallel to complete the measurements.

In some aspects of the present disclosure, the UE falls back to a procedure where each individual subscription performs its own neighbor measurements when any of the subscriptions becomes out-of-service (OOS), experience radio link failure (RLF), or when measurement results are not available or are stale in a common measurement results database.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a multi-SIM (MSIM) measurement module 140. For brevity, only one UE 120d is shown as including the MSIM measurement module 140. The MSIM measurement module 140 may measure, with a first of a set of subscriptions, neighbor cells of at least one other subscription of the set of subscriptions; and store measurement results from measuring the neighbor cells in a common measurement results database, while avoiding duplicates. The MSIM measurement module 140 may also report, with a subscription for which a neighbor is configured by a network, the measurement results from the common measurement results database.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
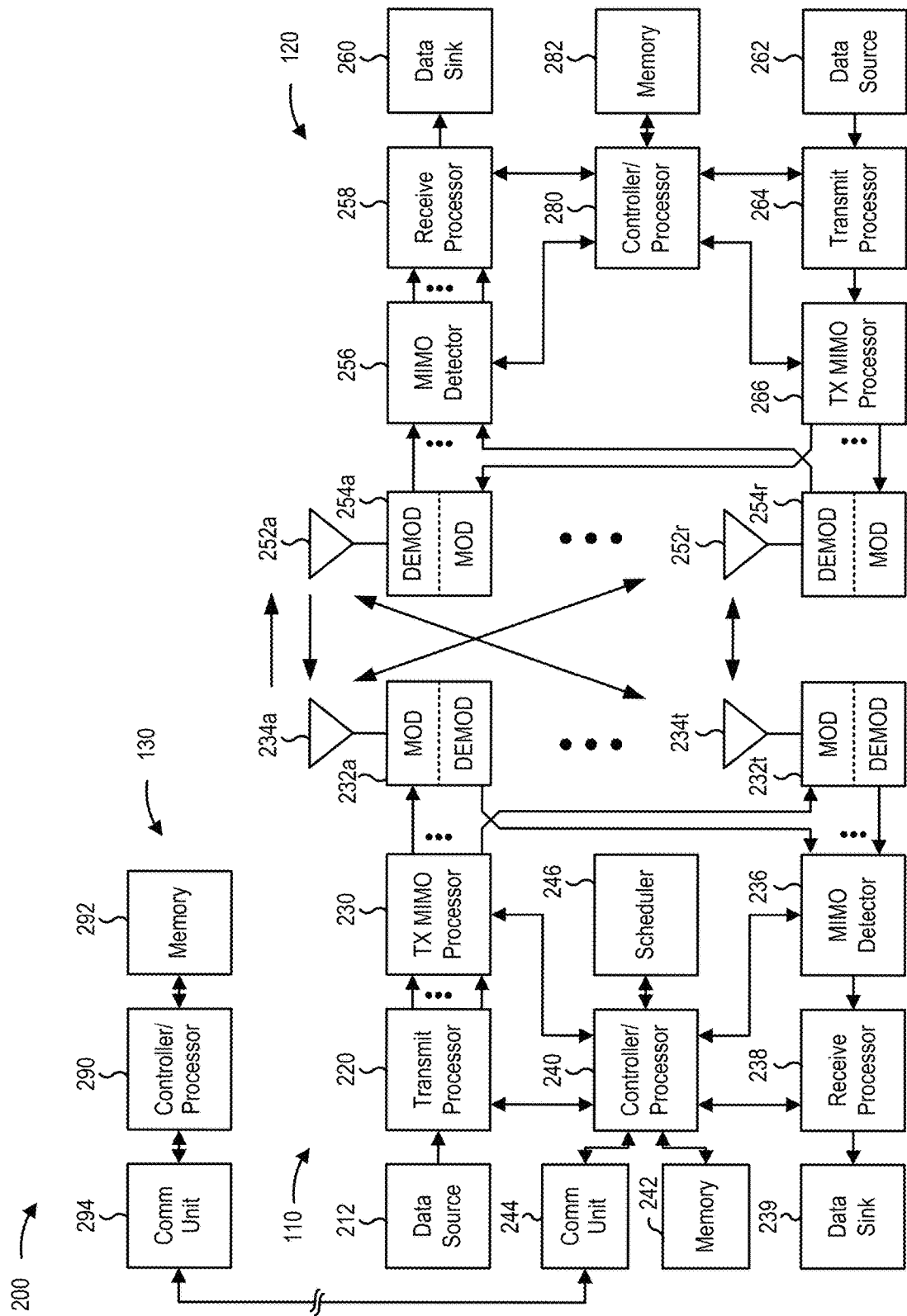
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T>1 and R>1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the UE 120, and/or any other component(s) of FIG. 2 may perform one or more techniques associated with the improved measurement techniques as described in more detail elsewhere. For example, the controller/processor 280 of the UE 120, and/or any other component(s) of FIG. 2 may perform or direct operations of, for example, the process of FIG. 11 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for measuring, means for storing, means for reporting, means for selecting, and means for alternating measuring. Such means may include one or more components of the UE 120 described in connection with FIG. 2.

As indicated above, FIG. 2 is provided merely as an example. Other examples may differ from what is described with regard to FIG. 2.

As described above, a multi-SIM (subscriber identity module) UE is a UE with multiple mobile network subscriptions. For example, a UE may have a first subscription with Verizon Wireless and a second subscription with AT&T Wireless. Thus, the UE can connect to either or both of the mobile networks. An example use case of a multi-SIM device is a mobile phone with a first subscription dedicated to personal calls and a second subscription dedicated to business calls.

According to aspects of the present disclosure, a power and throughput performance optimized neighbor measurement method is proposed for a multi-SIM UE, such as a Dual SIM, Dual Active (DSDA) and a Dual SIM, Dual Standby (DSDS) UE. A DSDA UE has two transceivers to allow connection to both subscriptions simultaneously. A DSDS UE has a single transceiver shared between the two SIMs to allow connection to one subscription at a time. For DSDS UEs, the processor manages both SIMs simultaneously although communication does not occur via both SIMs simultaneously.

Handover is a radio resource control (RRC) connected mode mobility procedure for keeping the UE connected at all times. Cell reselection is an RRC idle mode mobility procedure to ensure the UE is camped on a cell at all times. As a pre-requisite for these procedures, the UE periodically performs measurements of neighbor cell strengths. The UE sends measurement reports for neighbors in radio resource control (RRC) connected mode and performs self-evaluation to move to a stronger neighbor cell in RRC idle mode.

With existing systems, DSDS and DSDA UEs perform individual neighbor cell search and measurements for each subscription inefficiently in terms of the overall current and power consumption at the battery. The UEs may also be inefficient with respect to performance and throughput for the connected subscription. For example, with DSDS and DSDA UEs, additional sleep/wakeup overhead causes extra power drain by individual subscriptions in order to perform their own neighbor cell search and measurements.

In DSDA UEs, when both subscriptions are connected, any overlap in the network configured periodic measurement occasion may result in processor overload due to the processing of measurements for both SIMs simultaneously, and hence, higher demand for electrical current. In some cases, the UE skips one of the measurements to provide relief to the processor.

The above-mentioned overhead costs are applicable to scenarios when each subscription is to a different network operator. Inefficiencies become even more significant when both subscriptions are to the same operator. For example, when both subscriptions are to the same network operator, there may be overlap and redundancy in terms of neighbor cells for search and measurements across subscriptions. In DSDS UEs, when one of the subscriptions takes away radio frequency (RF) and baseband resources to perform neighbor cell search and measurements, the reallocation of resources may cause an outage on the connected subscription resulting in throughput loss.

The measurement process specifies radio frequency (RF) tuning to frequencies of respective radio access technologies (RATs) and tuning back to the serving cell frequency for each measurement interval. In a connected state, the measurement uses network configured gaps or gapless measurements. A larger number of gaps configured during connected mode causes more power drain at the battery. In idle mode, the UE performs its measurements during the intervals between discontinuous reception (DRX) cycles. More frequent UE wakeups for such measurements, increase power drain. The power drain due to the measurements becomes more pronounced if the UE has multiple SIM cards as the UE performs measurements for both subscriptions.

Figure 3:
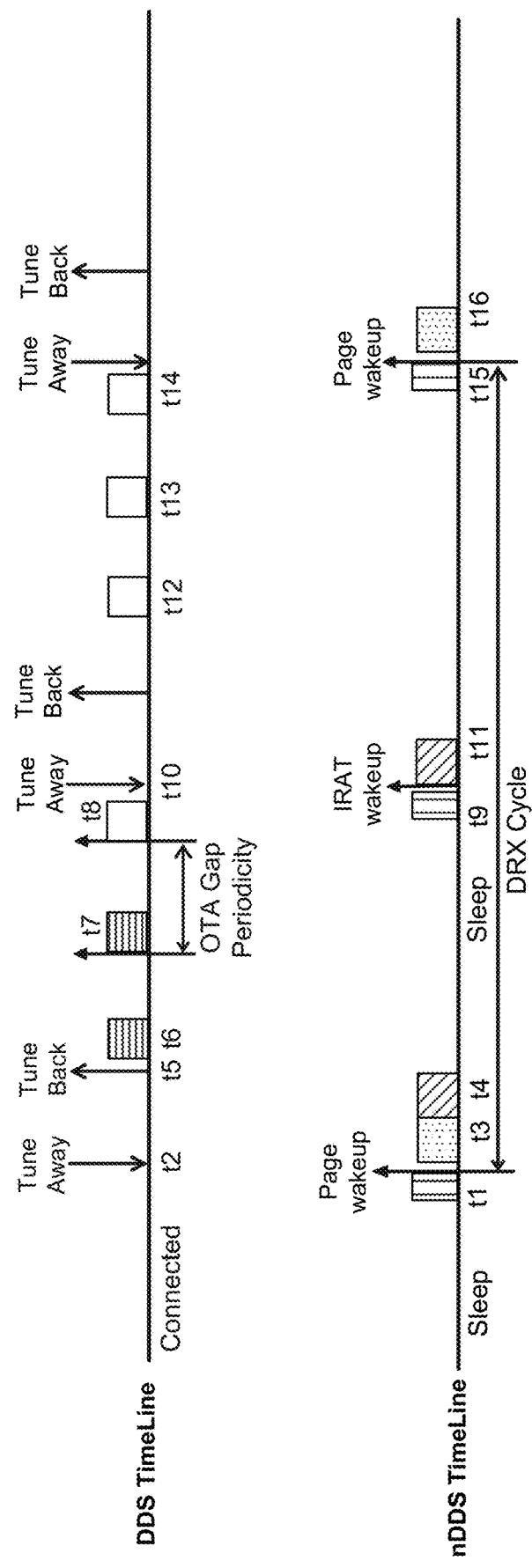
FIG. 3 is a diagram illustrating timelines for a dual subscriber identity module (SIM) UE performing neighbor measurements.

FIG. 3 is a diagram illustrating timelines for a dual subscriber identity module (SIM) UE performing neighbor measurements. In the example of FIG. 3, a multi-SIM (MSIM) UE includes a first subscription (a default data subscription (DDS)) performing neighbor measurements in network over-the-air (OTA) gaps at a measurement gap periodicity of 40 ms or 80 ms. Also, a second subscription (a non-default data subscription (nDDS)) performs neighbor measurements in idle mode, after a page operation or during a separate wakeup.

In the example of FIG. 3, the default data subscription (DDS) is in connected mode and the non-default data subscription (nDDS) is in idle mode. At time t1, the nDDS wakes up from sleep mode and prepares to check whether a page is received, in other words, whether there is an incoming call. At time t2, the UE tunes away from the DDS to the nDDS. The nDDS wakes for the page and at time t3 decodes any incoming page. The UE also addresses mobility while the nDDS is awake. In other words, at time t4, the UE measures neighbors for the nDDS, before the UE tunes back to the DDS at time t5. At times t6 and t7, the UE measures neighbor cells for the DDS during over the air (OTA) measurement gaps. The periodicity of a single OTA measurement gap is shown between times t7 and t8. At time t8, an OTA gap remains unused. In other words, no measurement is performed.

At time t9, the UE prepares for its next wakeup for the nDDS measurements. After the tune away at time t10, the UE performs measurements of neighbor cells for the nDDS. After tuning back to the DDS, three unused OTA measurement gaps occur at times t12, t13, and t14 before the UE again wakes up the nDDS and prepares to check for a page at time t15. After the tune away, at time t16, the UE decodes any incoming page for the nDDS and the process continues. It is noted that a DRX cycle for the nDDS is shown between times t1 and t16. As can be seen from the example in FIG. 3, the UE wakes up the nDDS for a measurement at times t9 and t11, while unused measurement gaps exist for the DDS at times t8, t12, t13, and t14.

According to aspects of the present disclosure, a common framework enables a neighbor cell measurement configuration to remove the inefficiencies noted with respect to the procedure shown in FIG. 3. Measurement results may be shared across subscriptions so that performance and power impact is improved or even optimized. That is, there are fewer additional wakeups and tune always and any redundancy may be reduced or even eliminated. Aspects of the present disclosure employ procedures based on a subscriptions state (e.g., idle/connected) and connected subscription traffic state (e.g., high traffic or low traffic). The procedures may also be based on a number of configured intra/inter radio access technology (IRAT) measurement frequencies for each subscription, as well as time to measure specifications configured for each subscription.

In some aspects of the present disclosure, a connected subscription in a high traffic state may utilize network configured gaps to measure frequencies on behalf of other subscriptions. The UE may use the connected subscription for multiple frequency measurements in each gap, using extra RF chains (for example, provided for carrier aggregation (CA)), to finish measurements faster.

In some aspects of the present disclosure, a connected subscription in a low traffic state may utilize a network synchronized connected mode discontinuous reception (C-DRX) OFF time to measure frequencies on behalf of additional subscriptions. The UE may use the connected subscription for multiple frequency measurements in parallel to finish the measurements.

When both subscriptions are idle, one of the subscriptions may utilize DRX cycle gaps to measure frequencies on behalf of other subscriptions. The UE may perform multiple frequency measurements in parallel to complete the measurements.

In some aspects of the present disclosure, the UE falls back to a procedure where each individual subscription performs its own neighbor measurements when any of the subscriptions becomes out-of-service (OOS), experience radio link failure (RLF), or when measurement results are not available or are stale in a common measurement results database.

Figure 4:
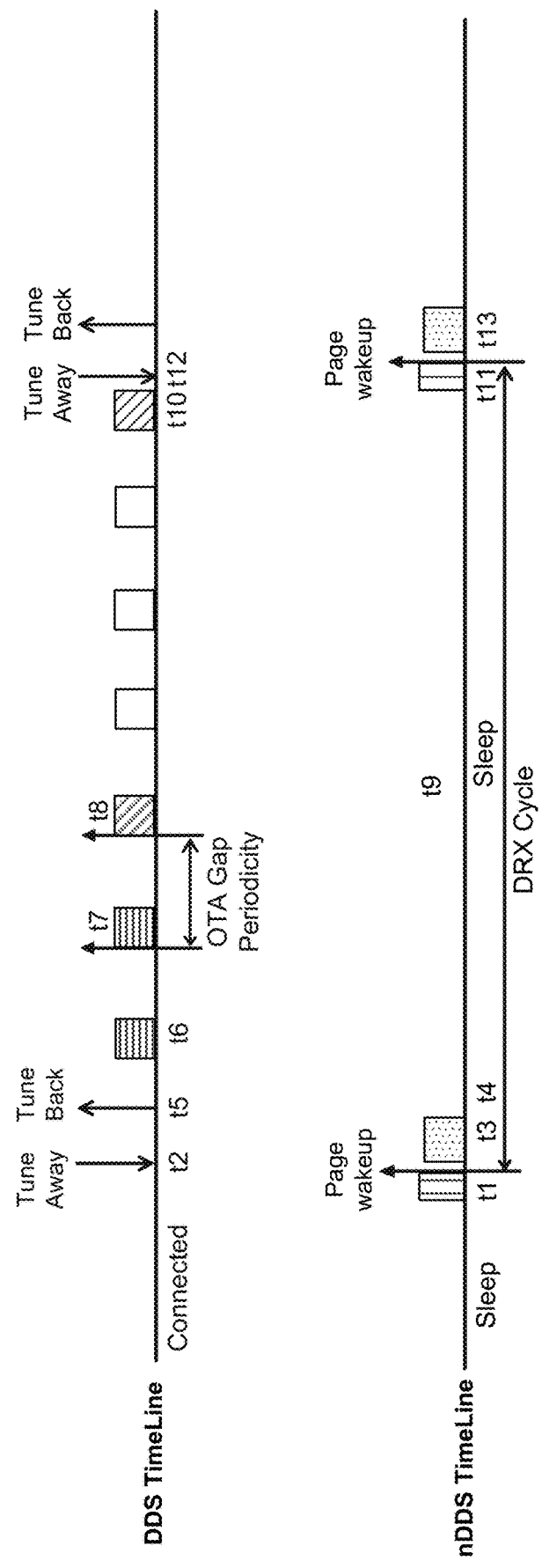
FIG. 4 is a diagram illustrating timelines for a dual SIM UE performing neighbor measurements during measurement gaps, in accordance with aspects of the present disclosure.

FIG. 4 is a diagram illustrating timelines for a dual SIM UE performing neighbor measurements during measurement gaps, in accordance with aspects of the present disclosure. In the example of FIG. 4 a multi-SIM (MSIM) UE includes a first subscription (default data subscription (DDS)) performing neighbor measurements in network over-the-air (OTA) gaps at a measurement gap periodicity of 40 ms or 80 ms. The DDS subscription also performs neighbor measurements for a second subscription (non-default data subscription (nDDS)), in the measurement gaps configured for the DDS. As a result, the UE completes measurements for both subscriptions faster than the scenario shown in FIG. 3. The nDDS subscription does not perform any measurement activities, saving wakeups and saving tune aways for the DDS subscription, which improves both power savings and throughput.

In the example of FIG. 4, the default data subscription (DDS) is in connected mode and the non-default data subscription (nDDS) is in idle mode. At time t1, the nDDS wakes up from sleeping and prepares to check whether a page is received. At time t2, the UE tunes away from the DDS to the nDDS. At time t3, the nDDS searches for paging and decodes any incoming page. In the example of FIG. 4, the UE does not address mobility at time t4. Rather, the UE tunes back to the DDS at time t5, which occurs immediately after page decoding at time t3. At times t6 and t7, the UE measures neighbor cells for the DDS during over the air (OTA) measurement gaps. The periodicity of a single OTA measurement gap is shown between times t7 and t8. At time t8, the UE measures neighbor cells with the DDS on behalf of the nDDS. Thus, at time t9, the UE does not wake up for nDDS measurements. Rather, after the UE measures neighbor cells with the DDS on behalf of the nDDS at time t10, the UE continues to sleeps until it is time to wake up the nDDS and prepare to check for a page at time t11. After the tune away, at time t12, the UE decodes any incoming page for the nDDS at time t13 and the process continues. It is noted that a DRX cycle for the nDDS is shown between times t1 and t13 and does not include any interruptions for measuring of neighbor cells for the nDDS.

Figure 5:
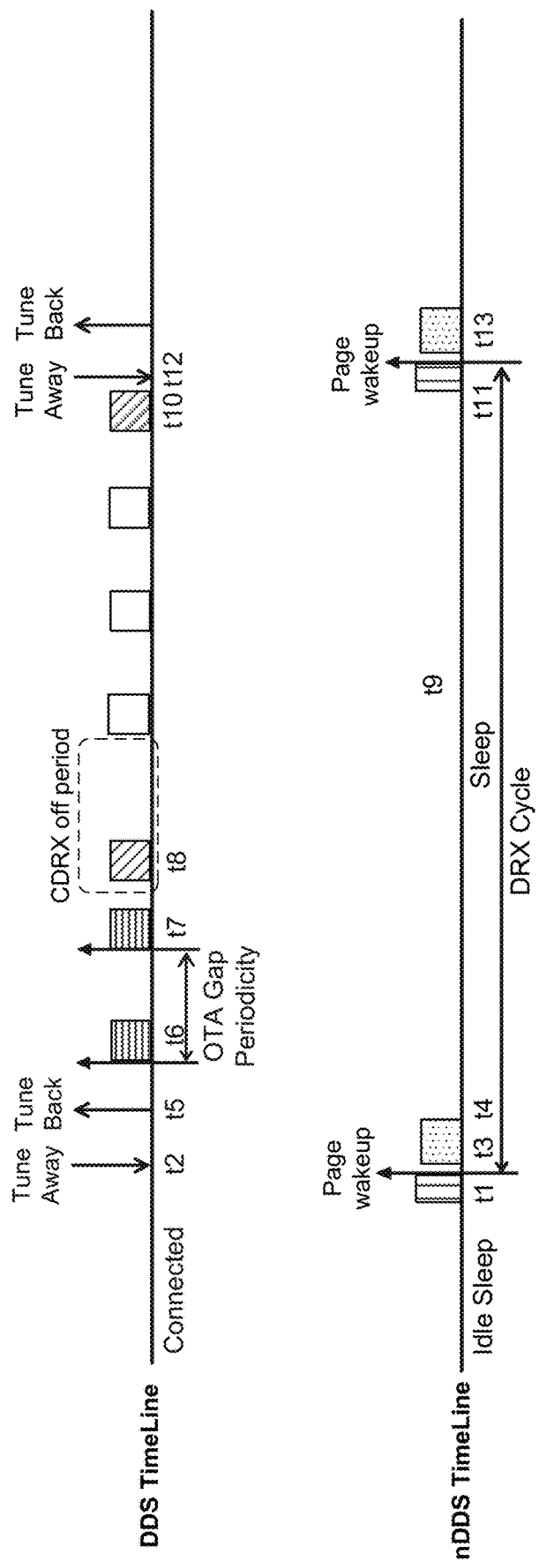
FIG. 5 is a diagram illustrating timelines for a dual SIM UE performing neighbor measurements during a connected mode discontinuous reception (C-DRX) OFF period and a measurement gap, in accordance with aspects of the present disclosure.

FIG. 5 is a diagram illustrating timelines for a dual SIM UE performing neighbor measurements during a connected mode discontinuous reception (C-DRX) OFF period and a measurement gap, in accordance with aspects of the present disclosure. In the example of FIG. 5, a multi-SIM UE includes a first subscription (default data subscription (DDS)) performing neighbor measurements in network over-the-air (OTA) gaps. The DDS subscription also performs neighbor measurements for the second subscription (nDDS), in the measurement gaps configured for the DDS and also in connected mode discontinuous reception (C-DRX) OFF periods of the DDS. As a result of this procedure, the UE completes measurements for both subscriptions faster than the scenario shown in FIG. 3. The nDDS subscription does not perform any measurement activities, saving wakeups and improving power, and also saving tune aways from the DDS subscription, which improves throughput.

In the example of FIG. 5, the default data subscription (DDS) is in connected mode and the non-default data subscription (nDDS) is in idle mode. At time t1, the nDDS wakes up from sleeping and prepares to check whether a page is received. At time t2, the UE tunes away from the DDS to the nDDS. The nDDS scans for the page and at time t3 decodes any incoming page. In the example of FIG. 5, the UE does not address mobility at time t4. Rather, the UE tunes back to the DDS at time t5, which occurs immediately after page decoding at time t3. At times t6 and t7, the UE measures neighbor cells for the DDS during over the air (OTA) measurement gaps. At time t8, the UE measures neighbor cells on behalf of the nDDS during a C-DRX OFF period. Thus, at time t9, the UE does not wake up for nDDS measurements. Rather, after the UE measures additional neighbor cells on behalf of the nDDS at time t10, the UE wakes up for the nDDS and prepares to check for a page at time t11. After the tune away at time t12, the UE decodes any incoming page for the nDDS at time t13 and the process continues. It is noted that a DRX cycle for the nDDS is shown between times t1 and t13 and does not include any interruptions for measuring of neighbor cells for the nDDS.

Figure 6:
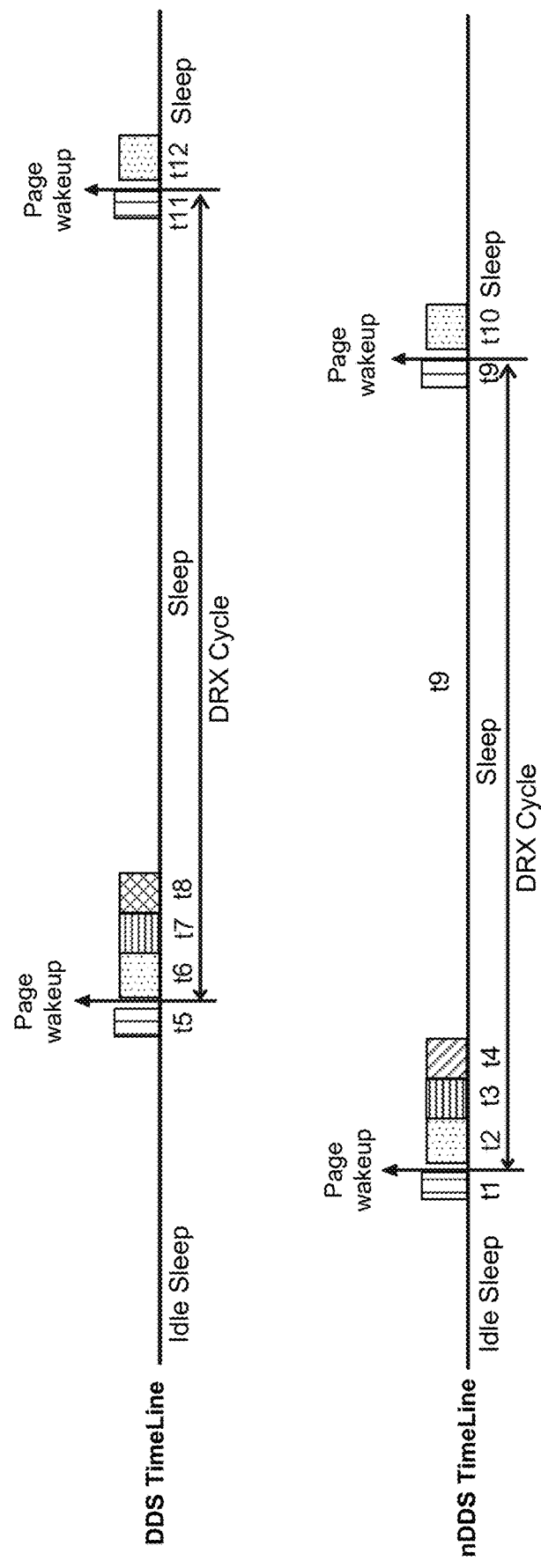
FIG. 6 is a diagram illustrating timelines for a dual SIM UE performing measurements of common neighbors, in accordance with aspects of the present disclosure.

FIG. 6 is a diagram illustrating timelines for a dual SIM UE performing measurements of common neighbors, in accordance with aspects of the present disclosure. In the example of FIG. 6, both the default data subscription (DDS) and the non-default data subscription (nDDS) are in idle mode. The DDS performs neighbor measurements in idle mode for both its neighbors and the nDDS neighbors. The nDDS performs measurement activities of its own neighbors as well as for DDS neighbors. This procedure saves a number of wakeups, improving power consumption, and completes the neighbor measurements faster than if each subscription only measured its own neighbor cells. In the procedure shown in FIG. 6, if wakeups for the two SIMS coincide, one subscription can take care of measurements for the other subscription, avoiding band conflicts or resource conflicts. In the case of both subscriptions to the same operator, a common neighbor need not be measured again by another subscription.

At time t1, the nDDS wakes up from sleeping and prepares to check whether a page is received. At time t2, the UE decodes any incoming page for the nDDS. At time t3, the nDDS measures neighbor cells on behalf of the DDS and at time t4, the nDDS measures its own neighbor cells. At time t5, the DDS wakes up from sleeping and prepares to check whether a page is received. At time t6, the UE decodes any incoming page for the DDS. At time t7, the DDS measures its own neighbor cells. At time t8, the UE measures common neighbor cells, which are cells that are neighbors for the DDS and also neighbors for the nDDS. At time t9, the UE wakes up the nDDS and prepares to check for a page at time t10. At time t11, the UE wakes up the DDS and prepares to check for a page at time t12.

The proposed procedures are applicable for DSDS and DSDA modes. Additional details will now be described. According to aspects of the present disclosure, the software stack for each subscription derives the neighbors to be measured and stores the neighbors in a database commonly accessible to both subscription's software stack. In the case of a subscription in connected mode, the UE receives mobility measurement related information from the network. In the case of a subscription in idle mode, the UE receives neighbor information from system information blocks (SIBs) for idle mode measurements.

The database may be referred to as a common measurement database. According to aspects of the present disclosure, the common measurement database may contain measurement configuration information including interfrequency and IRAT neighbor frequencies based on SIBs (for idle mode) or a dedicated measurement configuration (for connected mode) along with subscription information. Measurement targets that are to be measured may be marked with a flag based on trigger events such as A1, A2, (e.g., when the serving cell becomes better or worse than a threshold for LTE frequencies), etc. or B1, B2 (for IRAT frequencies becoming better than a threshold), etc. The common measurement database may also contain periodic measurements for a subscription performing connected mode measurements as well as reselection evaluation based measurements for a subscription in idle mode. The common measurement database may store measurement results with reference signal received power (RSRP) values and reference signal received quality (RSRQ) values along with a timestamp for the neighbor list in the database.

According to other aspects of the present disclosure, in both idle and connected modes, if there are common neighbors to be measured between the subscriptions, only one subscription performs measurements of those common neighbors. Another subscription can leverage the measurement results from the common measurement database.

According to further aspects of the present disclosure, an idle subscription performs measurements for those targets for which the connected subscription could not update the measurement database in time. This may occur for short idle DRX cycles or when a connected subscription has a high number of measurement layers.

According to other aspects of the present disclosure, for a DSDA configuration, each subscription may obtain measurement targets from the common database and then perform measurements. The measurements are shared, regardless of whether any subscriptions are in idle or in connected state. Each subscription obtains the target from the common database, measures its own targets first, and then measures the remaining targets for the other subscription. As a result of the procedure, the combined measurement of all neighbors will finish with fewer wakeups than for the two subscriptions when measuring individually, thereby saving wakeup and power overhead.

When both subscription measurement occasions overlap with each other in connected mode, the procedure may change to avoid concurrent measurements. In such cases, if the measurement periodicity of both subscriptions is such that one subscription can accommodate measuring all the targets for both the subscriptions, only one subscription performs the measurement. Alternatively, the subscriptions alternate occasions to ensure no simultaneous tuning activity for both subscriptions for the measurement gaps. No two measurement reports will be sent at the same time. Consequently, there will not be high central processing unit (CPU) utilization during the tuning activity, saving power by not advancing the tuning activity in time prior to the actual gap interval.

If both subscriptions are from the same operator, it is likely that both subscriptions will have a mostly common neighbor list and a common serving cell. In such a case, the total measurement time will be halved and will save 50% measurement related power. A periodic narrow power waveform results.

Figure 7:
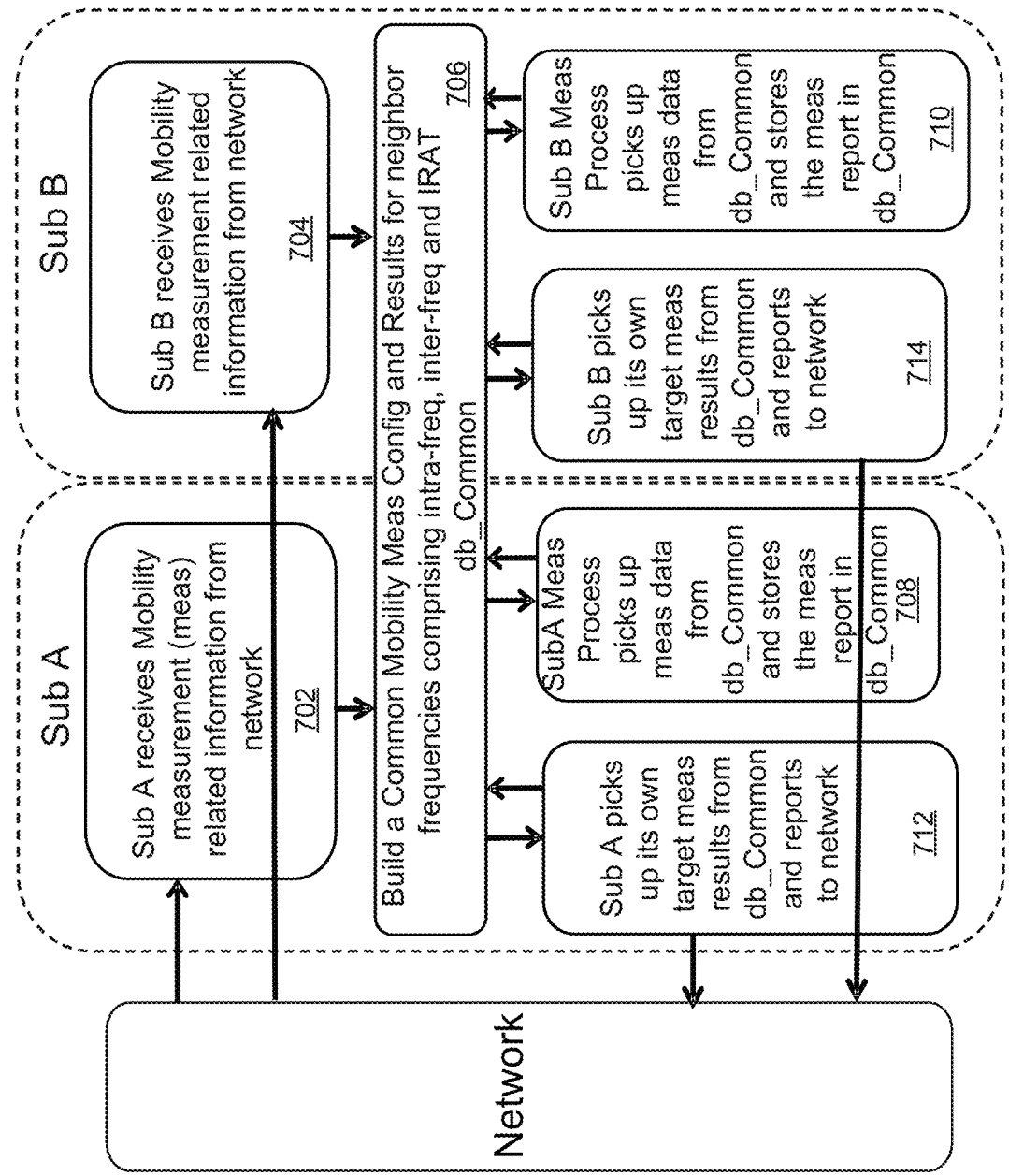
FIG. 7 is a block diagram illustrating a software stack architecture for a dual SIM, dual active (DSDA) UE, in accordance with aspects of the present disclosure.

FIG. 7 is a block diagram illustrating a software stack architecture for a dual SIM, dual active (DSDA) UE, in accordance with aspects of the present disclosure. In the example of FIG. 7, subscription A is in connected mode and subscription B is also in connected mode. Subscriptions A and B receive mobility measurement related information from the network at blocks 702 and 704, respectively. Subscriptions A and B store the mobility measurement related information in the common database (db_Common) at block 706.

At block 708, the measurement process of subscription A selects target cells for measurement, measures the cells and stores the measurement results in the common database. At block 710, the measurement process of subscription B selects target cells for measurement, measures the cells, and stores the measurement results in the common database. Each subscription selects the targets from the common database, measures their own targets first, and then measures the remaining targets for the other subscription, if possible.

At block 712, subscription A obtains its own target measurement results from the common database. Subscription A then reports the measurement results back to the network for handover considerations. At block 714, subscription B obtains its own target measurement results from the common database. Subscription B then reports the measurement results back to the network for handover considerations.

According to aspects of the present disclosure related to DSDS UEs, each subscription obtains measurement targets from the common database and performs measurement. If one subscription is in idle mode and the other subscription is in a connected state, the connected subscription performs measurements for the idle subscription measurement targets as long as the connected subscription is able to finish its own measurements and has time left in its measurement periodicity. The idle subscription is expected to send the measurement report earlier than if the proposed solution is not implemented.

In other aspects of the present disclosure, the connected mode subscription will use network configured measurement gaps, C-DRX off times and/or available antenna chains (for example, gapless measurement with carrier aggregation systems) to perform neighbor measurements for the idle subscription. An exception occurs for any panic search for a subscription or if there is an urgent need for the idle subscription to perform any measurement when the connected subscription is still measuring its own targets configured by the network.

A benefit of this procedure is reduction of the tune-away outage for the connected subscription and hence increases throughput, while keeping the measurement related power consumption for the two subscriptions the same as the current level. If both subscriptions are idle or in a connected state, they may share the measurement, picking up the targets from the common database. In this case, each subscription measures its own targets first and then measures the remaining targets for the other subscription.

Figure 8:
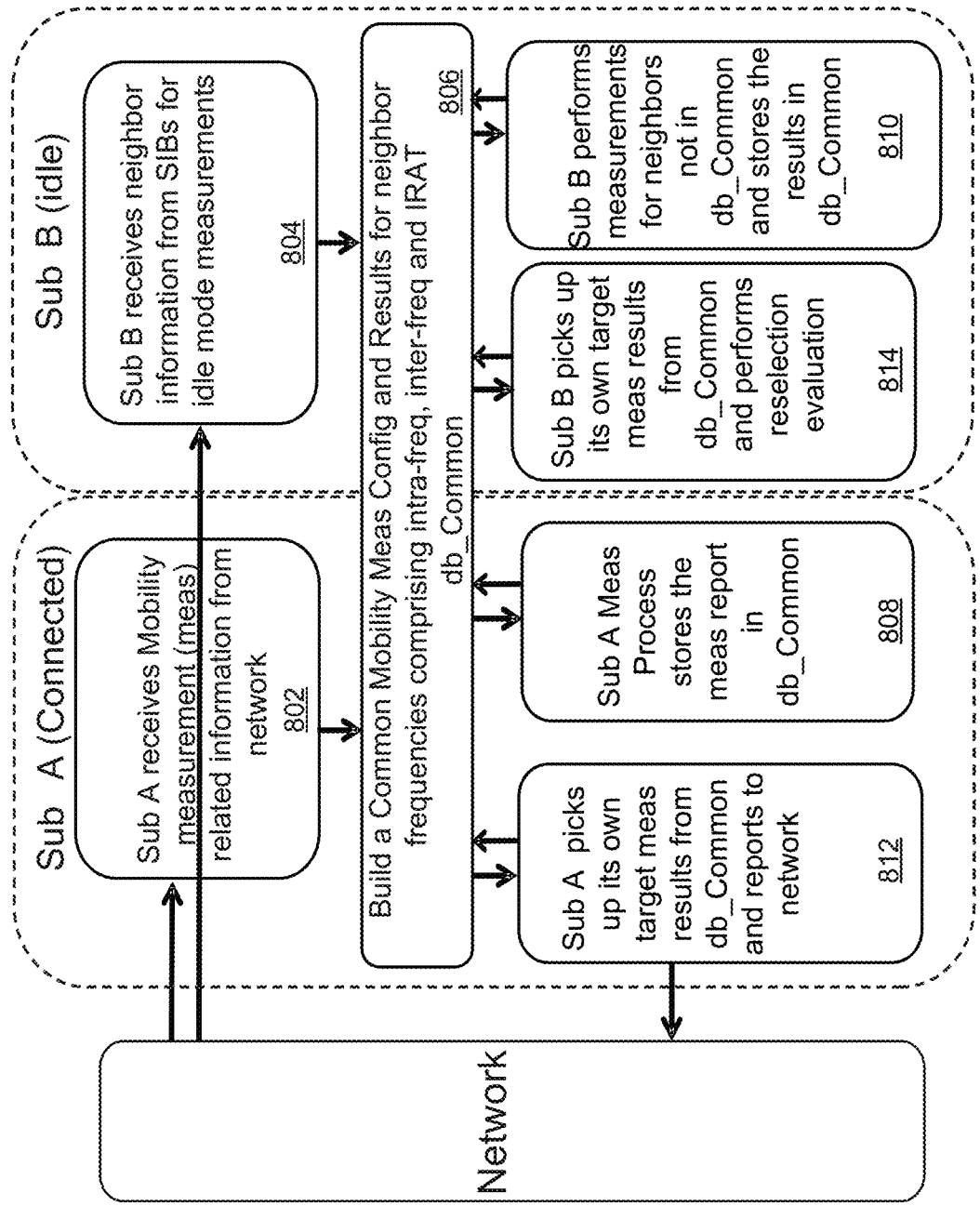
FIG. 8 is a block diagram illustrating a software stack architecture for a dual SIM, dual standby (DSDS) UE with one SIM in active mode and one SIM in idle mode, in accordance with aspects of the present disclosure.

FIG. 8 is a block diagram illustrating a software stack architecture for a dual SIM, dual standby (DSDS) UE with one SIM in active mode and one SIM in idle mode, in accordance with aspects of the present disclosure. In the example of FIG. 8, subscription A is in connected mode and subscription B is in idle mode. Subscription A receives mobility measurement related information from the network at block 802. Subscription B receives neighbor information from SIBs for idle mode measurements at block 804. Subscriptions A and B store the measurement related information in the common database (db_Common) at block 806.

At block 808, the measurement process of subscription A selects target cells for measurement (806 to 808), measures the cells and stores the measurement results in the common database (808 to 806). At block 810, subscription B selects target cells for measurement that are not in the common database, measures the cells, and stores the measurement results in the common database.

At block 812, subscription A obtains its own target measurement results from the common database. Subscription A then reports the measurement results back to the network for handover considerations. At block 814, subscription B obtains its own target measurement results from the common database. Subscription B then evaluates whether cell reselection is appropriate based on the measurements.

In case both subscriptions are in idle state, the combined measurements will finish with fewer wakeups for the two subscriptions than when measured individually, thereby saving the wakeup overhead power. If both the subscriptions are from the same operator, it is likely that both subscriptions will have a mostly common neighbor list and common serving cell. In such a case, the total measurement time will be halved and the UE saves 50% measurement related power. A periodic narrow power waveform results.

Figure 9:
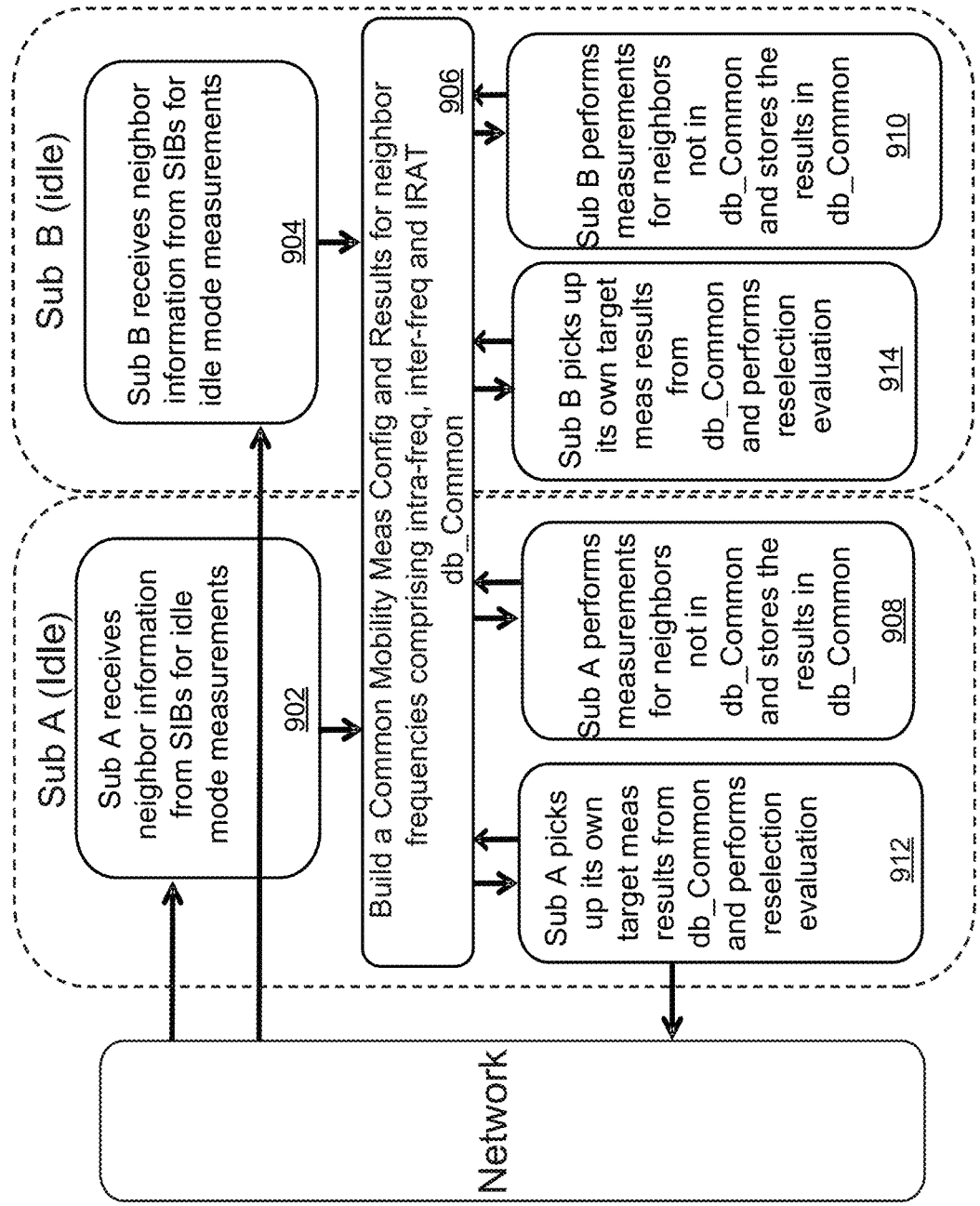
FIG. 9 is a block diagram illustrating a software stack architecture for a dual SIM, dual standby (DSDS) UE with both SIMS in idle mode, in accordance with aspects of the present disclosure.

FIG. 9 is a block diagram illustrating a software stack architecture for a dual SIM, dual standby (DSDS) UE with both SIMS in idle mode, in accordance with aspects of the present disclosure. In the example of FIG. 9, subscription A is in idle mode and subscription B is also in idle mode. Subscriptions A and B receive neighbor information from SIBs for idle mode measurements at blocks 902 and 904. Subscriptions A and B store the measurement related information in the common database (db_Common) at block 906.

At blocks 908 and 910, subscriptions A and B perform measurements for neighbor cells that are not in the common database, and store the measurement results in the common database. At blocks 912 and 914, subscriptions A and B each obtain their own target measurement results from the common database. Subscriptions A and B then evaluate whether cell reselection is appropriate based on the measurements.

According to aspects of the present disclosure, all radio access technologies spanning from GSM to 5G new radio (NR) and beyond are contemplated. The procedures reduce the measurement time, RF tuning activities, and power consumption of the overall UE. The procedures may provide 50% measurement power savings in cases where both the DSDS subscriptions are from the same service provider and are in the same state (idle and connected). The procedures result in substantial measurement related power savings for DSDS UEs when both subscriptions are in idle state. The procedures will have less tune-away outage and hence increased throughput for a connected subscription when a DSDS UE has one subscription idle and another in connected state. The procedures provide excellent measurement related power savings when both subscriptions are in DSDA settings.

Figure 10:
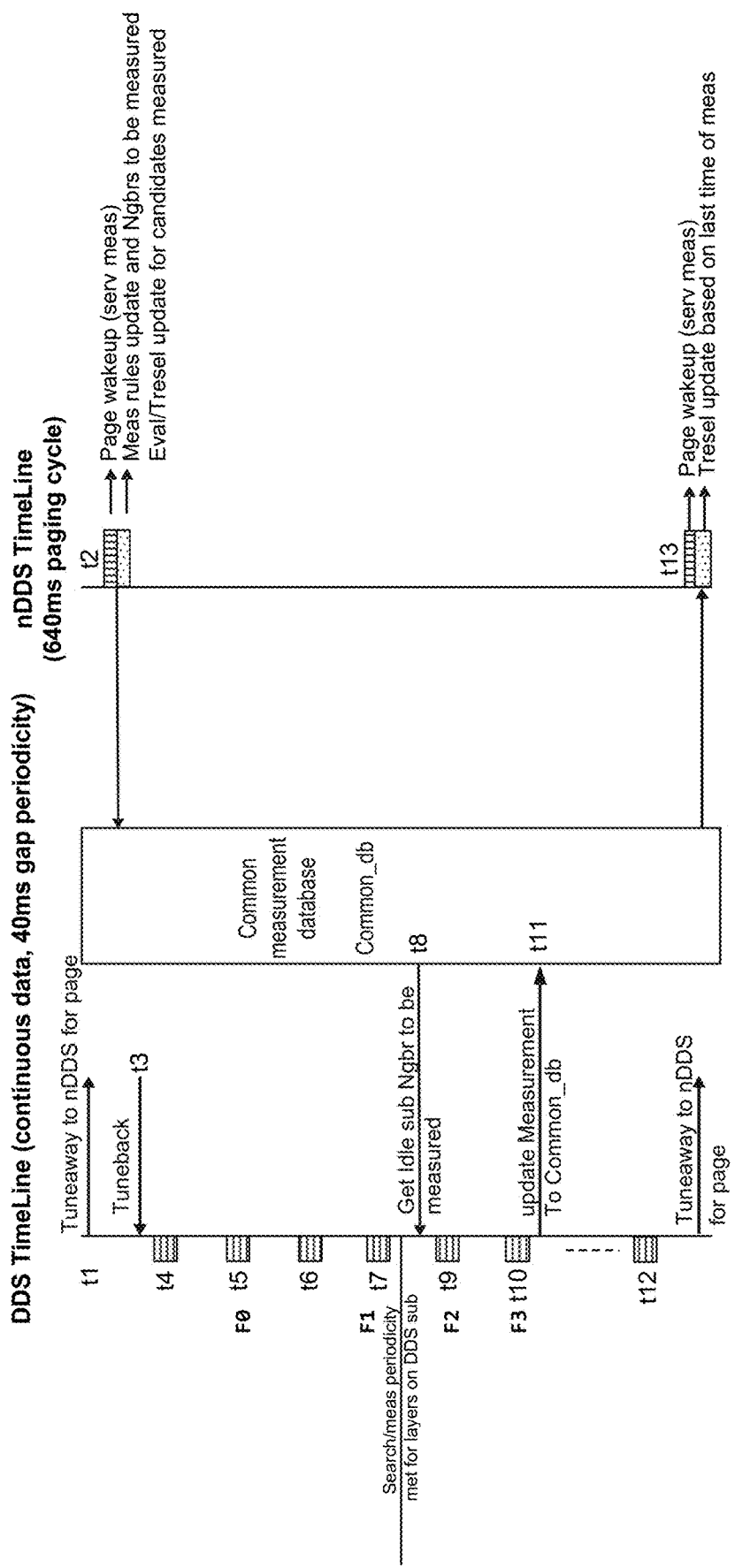
FIG. 10 is a diagram illustrating timelines for a dual SIM UE where a default SIM performs neighbor measurements for a non-default SIM, in accordance with aspects of the present disclosure.

FIG. 10 is a diagram illustrating timelines for a dual SIM UE where a default SIM performs neighbor measurements for a non-default SIM, in accordance with aspects of the present disclosure. In the example of FIG. 10, the first subscription, DDS, is in connected mode and the second subscription, nDDS, is in idle mode. The DDS has two frequency division duplex (FDD) inter-frequency neighbors F0 and F1. In this example, the gap periodicity is 40 ms and the measurement periodicity is 960 ms for the DDS. The first subscription, DDS, is in a continuous data mode (e.g., non-C-DRX). The second subscription, nDDS, is in idle mode with a 640 ms paging cycle and two inter-frequency neighbors, F2 and F3. The measurement periodicity is every two DRX cycles for the second subscription, nDDS.

At time t1, the UE tunes away from the DDS to the nDDS for page reception. At time t2, the nDDS wakes up to receive any page, and also receives updates on measurement rules, neighbors to be measured, a reselection timer (Tresel), and evaluation criteria for measured candidates. The nDDS also marks neighbors to be measured in the current DRX cycle, within the common measurement database.

At time t3, the UE tunes back to the DDS. Measurement gaps are available for the DDS at times t4, t5, t6, t7, t9, t10 and t12. During the measurement gaps at time t5 and t7, the DDS measures its inter-frequency neighbors F1 and F2, respectively. At time t8 because the searches for the measurement periodicity are completed for the DDS, the DDS retrieves from the common measurement database neighbors to measure on behalf of the nDDS. During the measurement gaps at times t9 and t10, the DDS measures the inter-frequency neighbors F2 and F3 for the nDDS. At time t11, the DDS updates the common measurement database with the results of its measurements of the frequencies F0, F1, F2, and F3. At time t12, the UE tunes to the nDDS to receive paging. The nDDS also updates the reselection timer, Tresel, based on the time of the last measurement.

Aspects of the present disclosure permit any of the subscriptions to measure the neighbors of other subscriptions and share the measurement configurations and results through a common database. For example, a connected subscription may perform measurements on behalf of an idle subscription. Alternately, while the UE is in multi-SIM mode depending on conditions, both subscriptions may share the measurement activity and update the common database. For DSDS UEs, the measurements of either subscriptions are accomplished using measurement gaps and/or C-DRX off times and/or using spare RF chains intended for techniques, such as carrier aggregation, with gapless measurement.

When the UE is in DSDA mode and the measurement occasions overlap, the subscriptions may utilize alternate opportunities to perform the shared measurements to avoid resource conflicts. As a special case, when operators of both subscriptions are the same it is likely that only one set of measurements is performed.

As indicated above, FIGS. 3-10 are provided as examples. Other examples may differ from what is described with respect to FIGS. 3-10.

Figure 11:
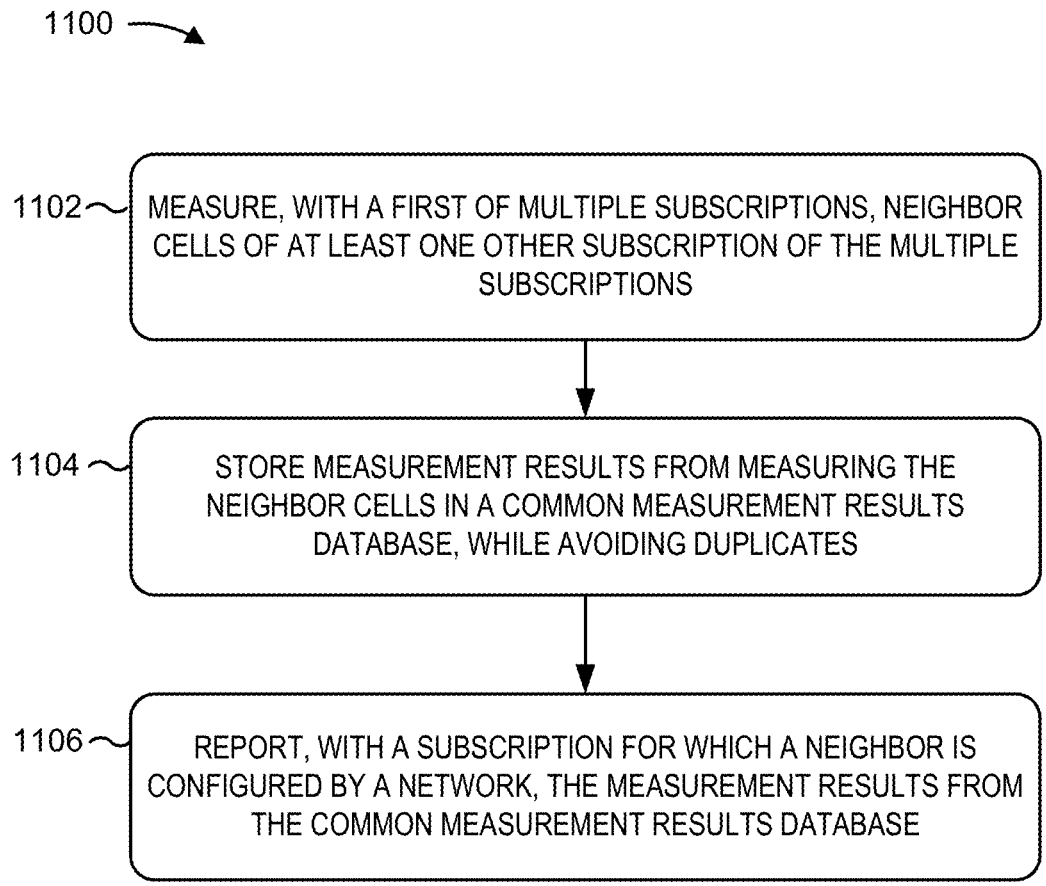
FIG. 11 is a flow diagram illustrating an example process performed, for example, by a multi-SIM UE, in accordance with various aspects of the present disclosure.

FIG. 11 is a flow diagram illustrating an example process 1100 performed, for example, by a multi-SIM UE, in accordance with various aspects of the present disclosure. The example process 1100 is an example of an improved neighbor measurement method for multiple subscriber identity module (SIM) user equipments (UEs), such as dual SIM dual active (DSDA) and dual SIM dual standby (DSDS) UEs. The operations of the process 1100 may be implemented by a UE 120.

At block 1102, the user equipment (UE) measures, with a first of a number of subscriptions, neighbor cells of at least one other of the subscriptions. For example, the UE (e.g., using the antenna 252, demodulator 254, MIMO detector 256, receive processor 258, controller/processor 280, memory 282, and/or the like) may measure the neighbor cells.

At block 1104, the user equipment (UE) stores measurement results from measuring the neighbor cells in a common measurement results database, while avoiding duplicates. For example, the UE (e.g., using the controller/processor 280, memory 282, and/or the like) may store the measurement results.

At block 1106, the user equipment (UE) reports, with a subscription for which a neighbor is configured by a network, the measurement results from the common measurement results database. For example, the UE (e.g., using the antenna 252, modulator (MOD) 254, transmit processor 264, TX multiple-input multiple-output (MIMO) processor 266, controller/processor 280, memory 282, and/or the like) may report the measurement results.

Implementation examples are described in the following numbered clauses.

1. A method of wireless communication by a user equipment (UE) capable of supporting a plurality of subscriptions, comprising:
   measuring, with a first of the plurality of subscriptions, neighbor cells of at least one other subscription of the plurality of subscriptions;
   storing measurement results from measuring the neighbor cells in a common measurement results database, while avoiding duplicates; and
   reporting, with a subscription for which a neighbor is configured by a network, the measurement results from the common measurement results database.

2. The method of clause 1, in which the first of the plurality of subscriptions is connected and the at least one other subscription of the plurality of subscriptions is idle and the measuring occurs in network configured gaps of the connected subscription.

3. The method of clause 1 or 2, in which the first of the plurality of subscriptions is connected and the at least one other subscription of the plurality of subscriptions is idle and the measuring occurs in a connected mode discontinuous reception (C-DRX) off duration of the connected subscription.

4. The method of any of clause 1, in which the first of the plurality of subscriptions is idle and the idle subscription measures its own neighbors, neighbors of other idle subscriptions of the plurality of subscriptions, and neighbors of connected subscriptions of the plurality of subscriptions.

5. The method of any of clauses 1-3, in which the first of the plurality of subscriptions is connected and the connected subscription measures its own neighbors, neighbors of other connected subscriptions of the plurality of subscriptions, and neighbors of idle subscriptions of the plurality of subscriptions.

6. The method of any of the preceding clauses, in which the first of the plurality of subscriptions uses at least one spare antenna chain to perform multiple neighbor measurements simultaneously.

7. The method of any of the preceding clauses, in which measuring of common neighbors among the plurality of subscriptions is not duplicated by any other subscription of the plurality of subscriptions.

8. The method of any of the preceding clauses, further comprising selecting target neighbor cells for measurement from the common measurement results database.

9. The method of any of the preceding clauses, further comprising measuring neighbor cells for all of the other subscriptions of the plurality of subscriptions.

10. The method of any of the preceding clauses, further comprising alternating measuring of neighbor cells with at least one other of the plurality of subscriptions.

11. An apparatus for wireless communication by a user equipment (UE) capable of supporting a plurality of subscriptions, comprising:
    a memory; and
    at least one processor coupled to the memory, the at least one processor configured:
    to measure, with a first of the plurality of subscriptions, neighbor cells of at least one other subscription of the plurality of subscriptions;

to store measurement results from measuring the neighbor cells in a common measurement results database, while avoiding duplicates; and to report, with a subscription for which a neighbor is configured by a network, the measurement results from the common measurement results database.

12. The apparatus of clause 11, in which the first of the plurality of subscriptions is connected and the at least one other subscription of the plurality of subscriptions is idle and the measuring occurs in network configured gaps of the connected subscription.

13. The apparatus of clause 11 or 12, in which the first of the plurality of subscriptions is connected and the at least one other subscription of the plurality of subscriptions is idle and the measuring occurs in a connected mode discontinuous reception (C-DRX) off duration of the connected subscription.

14. The apparatus of any of the clause 11, in which the first of the plurality of subscriptions is idle and the idle subscription measures its own neighbors, neighbors of other idle subscriptions of the plurality of subscriptions and neighbors of connected subscriptions of the plurality of subscriptions.

15. The apparatus of any of the clauses 11-13, in which the first of the plurality of subscriptions is connected and the connected subscription measures its own neighbors, neighbors of other connected subscriptions of the plurality of subscriptions and neighbors of idle subscriptions of the plurality of subscriptions.

16. The apparatus of any of the clauses 11-15, in which the first of the plurality of subscriptions uses at least one spare antenna chain to perform multiple neighbor measurements simultaneously.

17. The apparatus of any of the clauses 11-16, in which the at least one processor is further configured to measure common neighbors among the plurality of subscriptions without duplicating measuring by any other subscription of the plurality of subscriptions.

18. The apparatus of any of the clauses 11-17, in which the at least one processor is further configured to select target neighbor cells for measurement from the common measurement results database.

19. The apparatus of any of the clauses 11-18, in which the at least one processor is further configured to measure neighbor cells for all of the other subscriptions of the plurality of subscriptions.

20. The apparatus of any of the clauses 11-18, in which the at least one processor is further configured to alternate measuring of neighbor cells with at least one other of the plurality of subscriptions.

21. An apparatus for wireless communication by a user equipment (UE) capable of supporting a plurality of subscriptions, comprising:

means for measuring, with a first of the plurality of subscriptions, neighbor cells of at least one other subscription of the plurality of subscriptions;

means for storing measurement results from measuring the neighbor cells in a common measurement results database, while avoiding duplicates; and means for reporting, with a subscription for which a neighbor is configured by a network, the measurement results from the common measurement results database.

22. The apparatus of clause 21, in which the first of the plurality of subscriptions is connected and the at least one other subscription of the plurality of subscriptions is idle and the means for measuring measures in network configured gaps of the connected subscription.

23. The apparatus of clause 21 or 22, in which the first of the plurality of subscriptions is connected and the at least one other subscription of the plurality of subscriptions is idle and the means for measuring measures in a connected mode discontinuous reception (C-DRX) off duration of the connected subscription.

24. The apparatus of any of clause 21, in which the first of the plurality of subscriptions is idle and the idle subscription includes means for measuring its own neighbors, neighbors of other idle subscriptions of the plurality of subscriptions, and neighbors of connected subscriptions of the plurality of subscriptions.

25. The apparatus of any of clauses 21-23, in which the first of the plurality of subscriptions is connected and the connected subscription comprises means for measuring its own neighbors, neighbors of other connected subscriptions of the plurality of subscriptions, and neighbors of idle subscriptions of the plurality of subscriptions.

26. The apparatus of any of clauses 21-25, in which the first of the plurality of subscriptions uses at least one spare antenna chain to perform multiple neighbor measurements simultaneously.

27. The apparatus of any of clauses 21-26, further comprising means for measuring common neighbors among the plurality of subscriptions without duplicating measuring by any other subscription of the plurality of subscriptions.

28. The apparatus of any of the clauses 21-27, further comprising means for selecting target neighbor cells for measurement from the common measurement results database.

29. The apparatus of any of the clauses 21-28, further comprising means for measuring neighbor cells for all of the other subscriptions of the plurality of subscriptions.

30. The apparatus of any of the clauses 21-29, further comprising means for alternating measuring of neighbor cells with at least one other of the plurality of subscriptions.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE) capable of supporting a plurality of subscriptions, comprising:
   measuring, with a first of the plurality of subscriptions, neighbor cells of at least one other subscription of the plurality of subscriptions;
   storing measurement results from measuring the neighbor cells in a common measurement results database, while avoiding duplicates; and
   reporting, with a subscription for which a neighbor is configured by a network, the measurement results from the common measurement results database.

2. The method of claim 1, in which the first of the plurality of subscriptions is connected and the at least one other subscription of the plurality of subscriptions is idle and the measuring occurs in network configured gaps of the connected subscription.

3. The method of claim 1, in which the first of the plurality of subscriptions is connected and the at least one other subscription of the plurality of subscriptions is idle and the measuring occurs in a connected mode discontinuous reception (C-DRX) off duration of the connected subscription.

4. The method of claim 1, in which the first of the plurality of subscriptions is idle and the idle subscription measures its own neighbors, neighbors of other idle subscriptions of the plurality of subscriptions, and neighbors of connected subscriptions of the plurality of subscriptions.

5. The method of claim 1, in which the first of the plurality of subscriptions is connected and the connected subscription measures its own neighbors, neighbors of other connected subscriptions of the plurality of subscriptions, and neighbors of idle subscriptions of the plurality of subscriptions.

6. The method of claim 1, in which the first of the plurality of subscriptions uses at least one spare antenna chain to perform multiple neighbor measurements simultaneously.

7. The method of claim 1, in which measuring of common neighbors among the plurality of subscriptions is not duplicated by any other subscription of the plurality of subscriptions.

8. The method of claim 1, further comprising selecting target neighbor cells for measurement from the common measurement results database.

9. The method of claim 1, further comprising measuring neighbor cells for all of the other subscriptions of the plurality of subscriptions.

10. The method of claim 1, further comprising alternating measuring of neighbor cells with at least one other of the plurality of subscriptions.

11. An apparatus for wireless communication by a user equipment (UE) capable of supporting a plurality of subscriptions, comprising:
    a memory; and
    at least one processor coupled to the memory, the at least one processor configured:
       to measure, with a first of the plurality of subscriptions, neighbor cells of at least one other subscription of the plurality of subscriptions;
       to store measurement results from measuring the neighbor cells in a common measurement results database, while avoiding duplicates; and
       to report, with a subscription for which a neighbor is configured by a network, the measurement results from the common measurement results database.

12. The apparatus of claim 11, in which the first of the plurality of subscriptions is connected and the at least one other subscription of the plurality of subscriptions is idle and the measuring occurs in network configured gaps of the connected subscription.

13. The apparatus of claim 11, in which the first of the plurality of subscriptions is connected and the at least one other subscription of the plurality of subscriptions is idle and the measuring occurs in a connected mode discontinuous reception (C-DRX) off duration of the connected subscription.

14. The apparatus of claim 11, in which the first of the plurality of subscriptions is idle and the idle subscription measures its own neighbors, neighbors of other idle subscriptions of the plurality of subscriptions and neighbors of connected subscriptions of the plurality of subscriptions.

15. The apparatus of claim 11, in which the first of the plurality of subscriptions is connected and the connected subscription measures its own neighbors, neighbors of other connected subscriptions of the plurality of subscriptions and neighbors of idle subscriptions of the plurality of subscriptions.

16. The apparatus of claim 11, in which the first of the plurality of subscriptions uses at least one spare antenna chain to perform multiple neighbor measurements simultaneously.

17. The apparatus of claim 11, in which the at least one processor is further configured to measure common neighbors among the plurality of subscriptions without duplicating measuring by any other subscription of the plurality of subscriptions.

18. The apparatus of claim 11, in which the at least one processor is further configured to select target neighbor cells for measurement from the common measurement results database.

19. The apparatus of claim 11, in which the at least one processor is further configured to measure neighbor cells for all of the other subscriptions of the plurality of subscriptions.

20. The apparatus of claim 11, in which the at least one processor is further configured to alternate measuring of neighbor cells with at least one other of the plurality of subscriptions.

21. An apparatus for wireless communication by a user equipment (UE) capable of supporting a plurality of subscriptions, comprising:
means for measuring, with a first of the plurality of subscriptions, neighbor cells of at least one other subscription of the plurality of subscriptions;
means for storing measurement results from measuring the neighbor cells in a common measurement results database, while avoiding duplicates; and
means for reporting, with a subscription for which a neighbor is configured by a network, the measurement results from the common measurement results database.

22. The apparatus of claim 21, in which the first of the plurality of subscriptions is connected and the at least one other subscription of the plurality of subscriptions is idle and the means for measuring measures in network configured gaps of the connected subscription.

23. The apparatus of claim 21, in which the first of the plurality of subscriptions is connected and the at least one other subscription of the plurality of subscriptions is idle and the means for measuring measures in a connected mode discontinuous reception (C-DRX) off duration of the connected subscription.

24. The apparatus of claim 21, in which the first of the plurality of subscriptions is idle and the idle subscription includes means for measuring its own neighbors, neighbors of other idle subscriptions of the plurality of subscriptions, and neighbors of connected subscriptions of the plurality of subscriptions.

25. The apparatus of claim 21, in which the first of the plurality of subscriptions is connected and the connected subscription comprises means for measuring its own neighbors, neighbors of other connected subscriptions of the plurality of subscriptions, and neighbors of idle subscriptions of the plurality of subscriptions.

26. The apparatus of claim 21, in which the first of the plurality of subscriptions uses at least one spare antenna chain to perform multiple neighbor measurements simultaneously.

27. The apparatus of claim 21, further comprising means for measuring common neighbors among the plurality of subscriptions without duplicating measuring by any other subscription of the plurality of subscriptions.

28. The apparatus of claim 21, further comprising means for selecting target neighbor cells for measurement from the common measurement results database.

29. The apparatus of claim 21, further comprising means for measuring neighbor cells for all of the other subscriptions of the plurality of subscriptions.

30. The apparatus of claim 21, further comprising means for alternating measuring of neighbor cells with at least one other of the plurality of subscriptions.

* * * * *